Sept. 30, 1958  W. O. THOMPSON  2,854,227
COTTON WEIGHING MACHINE
Filed April 27, 1956  3 Sheets-Sheet 1

WALTER O. THOMPSON
INVENTOR
HUEBNER, BEEHLER,
WORREL & HERZIG
ATTORNEYS
BY
Richard M. Worrel Sept. 30, 1958     W. O. THOMPSON     2,854,227
COTTON WEIGHING MACHINE Filed April 27, 1956     3 Sheets-Sheet 2

WALTER O. THOMPSON
INVENTOR
HUEBNER, BEEHLER,
WORREL & HERZIG
ATTORNEYS
BY
Richard M. Worrel Sept. 30, 1958  W. O. THOMPSON  2,854,227
COTTON WEIGHING MACHINE
Filed April 27, 1956  3 Sheets-Sheet 3

WALTER O. THOMPSON
INVENTOR
HUEBNER, BEEHLER,
WORREL & HERZIG
ATTORNEYS
BY

United States Patent Office 2,854,227
Patented Sept. 30, 1958

2,854,227

COTTON WEIGHING MACHINE

Walter O. Thompson, Fresno, Calif.

Application April 27, 1956, Serial No. 581,125

12 Claims. (Cl. 265—40)

The present invention pertains to a material handling apparatus and more particularly to an apparatus for elevating a load at a predetermined original position, weighing the load, and lowering the load at a position displaced from its original position.

In the marketing of cotton, it is conventional practice for cotton gins, cooperatives, export companies, and the like, to arrange bales of cotton bought or to be sold in long rows in closely adjacent relation either in warehouses or in outdoor staging or storing areas. Normally these bales are individually weighed while in row formation.

One method of weighing such bales which is still quite common involves carting each bale from its position in a row on a hand truck to a centrally located scales, weighing the truck and bale, and returning the bale to its row. The weight of a bale is obtained by deducting the known weight of the bale truck from the scale reading observed. This is obviously a crude, time consuming system requiring many laborers in order to handle any substantial volume of cotton.

More recently, greater mechanization has been introduced in performing the task described. One well known machine for this purpose consists primarily of a lift truck carrying a scales and a bale clamp on the scales for releasably engaging a bale of cotton. This apparatus is unsatisfactory since it is necessary to drive along side of a row of bales, clamp onto a bale to be weighed, elevate the bale by elevating the lift mechanism of the truck, and then to back up the truck slightly in order to separate the bale from its adjacent bale while being weighed. After weighing, the bale is lowered and the truck driven forward to repeat the operation. The necessity of having to place the truck in reverse prior to each weighing is undesirable, time consuming and imposes additional wear on the truck as well as expense in its operation.

The subject invention provides a mobile apparatus for handling load material, such as bales of cotton but not limited thereto, which, insofar as the problem set forth above is concerned, is adapted to elevate, weigh and set down bales of cotton arranged in rows while constantly progressing in a forward direction of travel, only stopping briefly at each bale for weighing and otherwise handling such bales. Of course, the invention is not limited to handling bales of cotton nor to load materials arranged in rows but has many other applications as the following description will reveal.

It is an object of this invention to provide an apparatus especially adapted for elevating a load, freely suspending the load for weighing purposes, and lowering the load after it has been weighed.

Another object is to provide an apparatus especially adapted for weighing loads, such as bales of cotton arranged in rows, in individual rapid succession with a minimum of time and effort.

Another object is to provide a mobile apparatus for use in weighing bales of cotton and the like arranged in rows which does not necessitate placing the apparatus in reverse in order to separate a bale to be weighed from its forwardly adjacent bale.

Another object is to provide a weighing apparatus including a beam scales movable between spaced load pick-up and load release positions which does not twist or turn from a predetermined attitude during such movement.

Another object is to provide a material handling apparatus of the nature described which is easily and quickly attached to a conventional clamp truck.

Other objects are to provide a material handling apparatus which is economical to make and use, dependable in operation, durable in structure, mobile, and which is highly effective for accomplishing its intended purposes.

These and other objects will become more fully apparent upon reference to the following descrprition.

In the drawings:

Fig. 4 is a still further enlarged fragmentary view of a mechanism of the invention for holding a beam scales in a predetermined attitude including a support arm in full lines in a forwardly inclined load pick-up position and, in dashed lines, in an upright central weighing position and a rearwardly inclined load release position.

Fig. 5 is somewhat enlarged fragmentary view of a portion of the mechanism of Fig. 4 including a beam scale support bracket shown in unlatched condition and particularly illustrating the manner in which the beam scales is removed from the bracket.

Fig. 6 is a transverse section taken along line 6—6 of Fig. 5 showing the beam scales fragmentarily in dashed outline.

Fig. 7 is a horizontal fragmentary section taken on line 7—7 of Fig. 5.

Figure 1:
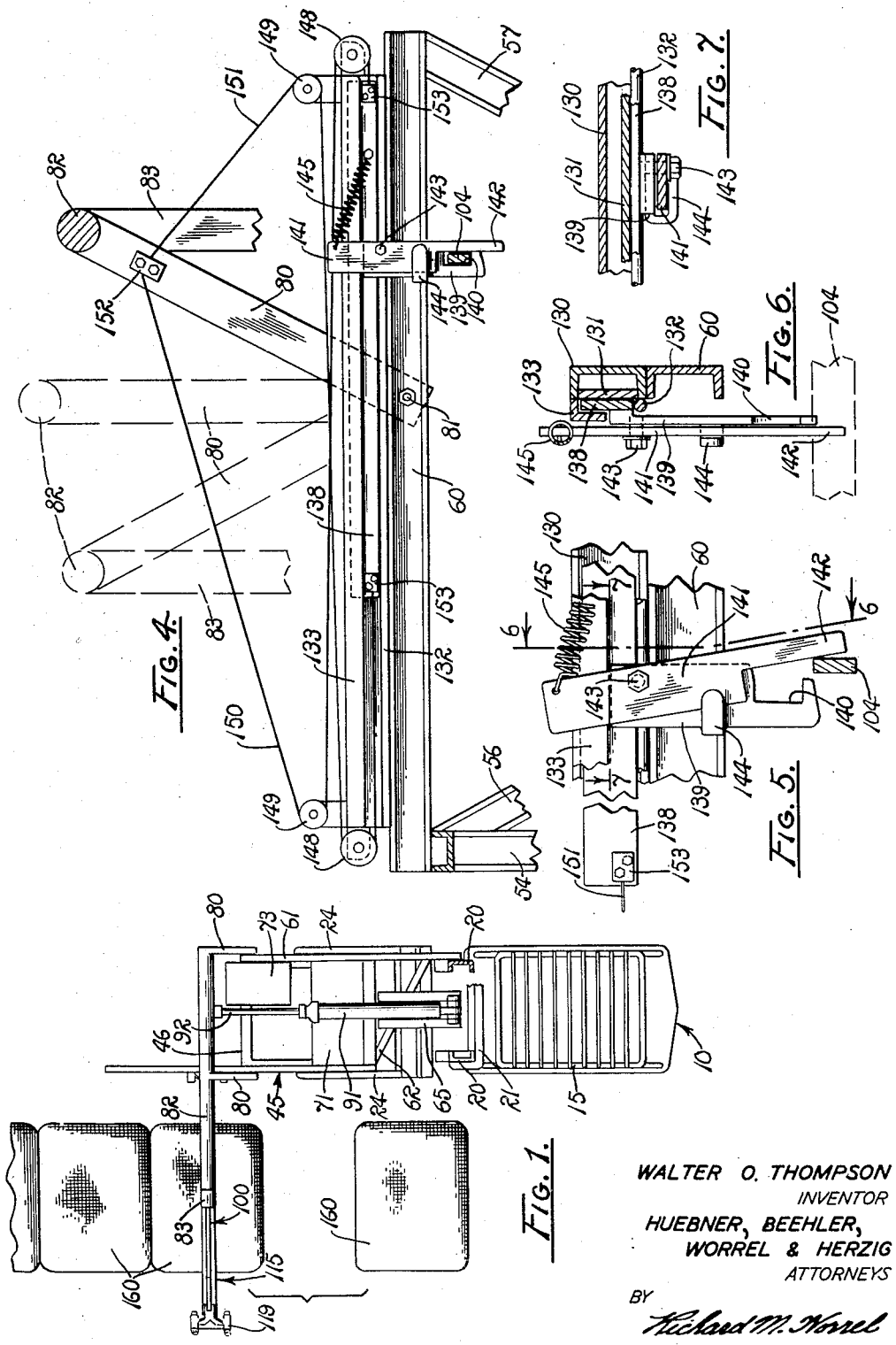
Fig. 1 is a top plan view of a material handling apparatus constructed in accordance with the principles of the present invention and a plurality of bales of cotton arranged in a row illustrative of loads which are conveniently weighed by the apparatus.

Referring with greater particularity to the drawings, a clamp truck 10 is best shown in Fig. 1 and includes front wheels 11 and rear wheels 12. The truck also provides an operator's seat 13, a steering wheel 14, and an upwardly arched operator's shield 15, as are well known in the art.

Figure 8:
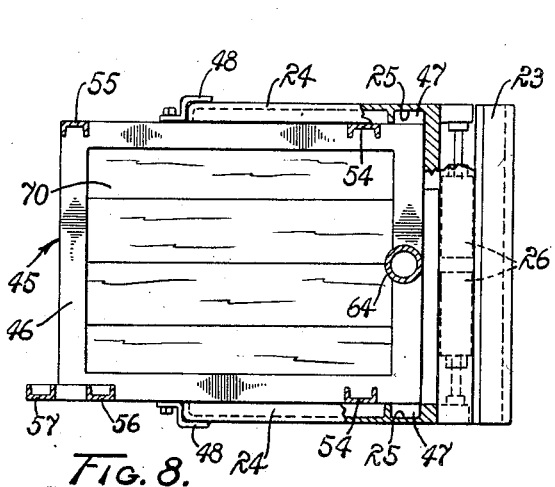
Fig. 8 is a horizontal section taken on line 8—8 of Fig. 2.
Figure 9:
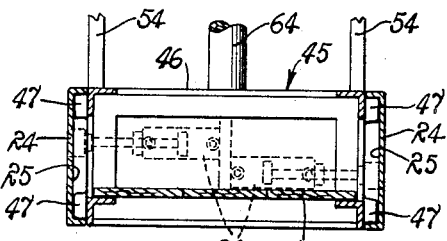
Fig. 9 is a fragmentary vertical section taken along 9—9 of Fig. 2.

Upwardly extended slightly rearwardly inclined guide channels 20 are mounted forwardly on the clamp truck 10, have outer sides, and are interconnected by a top bracket 21 in parallel spaced relation. Elevator arms 22 are forwardly extended from the truck and are adapted for elevational movement in the guide channels by means well known in the art. A support bracket 23 is mounted on the elevator arms and, in turn, mounts a pair of erect clamps 24 in opposed horizontally spaced relation. As best seen in Fig. 8, these clamps have opposed sockets 25 on the opposed inner sides thereof. Rams 26 provide cylinders connected to the support bracket 23 and oppositely outwardly extended piston rods connected to the clamps. Conduits 27 are individually connected to the rams, are extended over the top bracket 21, and have coupling members 28 at their opposite ends.

A pair of hydraulic valves 34 and 35 are mounted in the clamp truck 10 and a pair of levers 36 and 37 are provided for opening and closing the valves. Conduits 38 are connected to the valve 34 and have extended ends on which are provided coupling members 39.

An upright frame 45 having forward and rearward end portions and top and bottom portions is supported on the clamp truck 10 and for this purpose includes a substantially rectangular base 46 having laterally outwardly extended trunnions 47 releasably fitted in the sockets 25 of the clamps 24. As an additional aid in retaining the frame on the clamps, mounting members 48 are secured on opposite sides of the base and releasably receive forward edges of the clamps therein.

Figure 2:
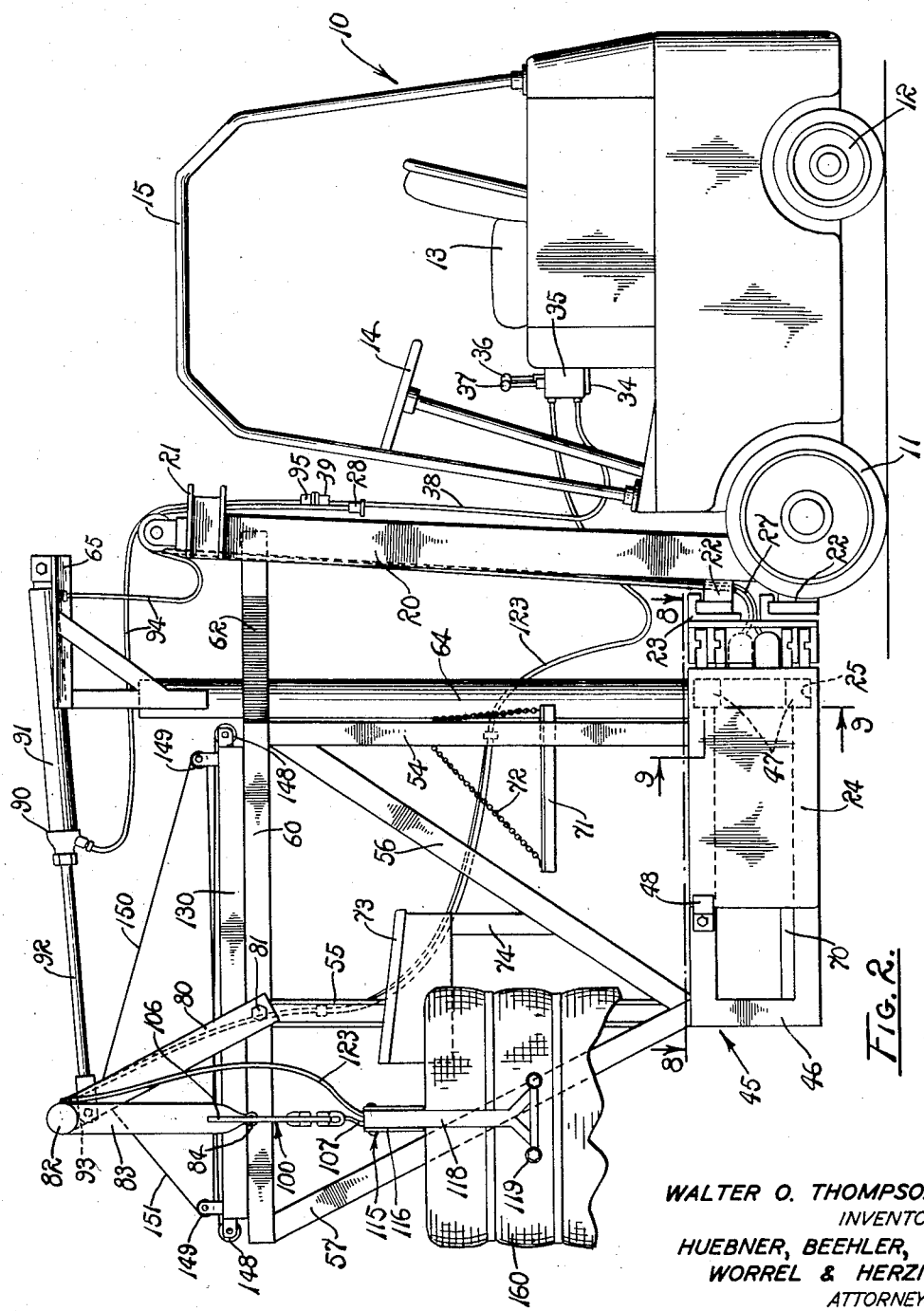
Fig. 2 is a somewhat enlarged side elevation of the material handling apparatus of Fig. 1 with a bale of cotton fragmentarily shown therewith.

The frame 45 conveniently includes a pair of rear vertical frame members 54 and a forward vertical frame member 55. A pair of intermediate diagonal frame members 56 extend from the forward end of the base 46 rearwardly upwardly for connection at upper ends of the rear frame members. A forwardly inclined front frame member 57 is connected at a lower end to the forward end of the base and at the opposite side of the frame from the forward vertical frame member 55, as best seen in Fig. 2.

The top portion of the frame 45 includes substantially horizontal top side frame members 60 and 61 extended from upper ends of the forwardly inclined frame member 57 and the front frame member 55, respectively, rearwardly to upper ends of the corresponding rear frame members 54. The top member 61 extends rearwardly into lateral engagement with a guide channel 20 for resisting lateral thrust imposed on the frame. A brace 62 is diagonally extended from the top member 60 rearwardly to the top member 61, as best seen in Fig. 1. A rear transverse frame member 63 interconnects the upper ends of frame members 54. A substantially vertical post 64 is upwardly extended from the base 46, and a mounting bracket 65 is secured at an upper end of the post. It will be evident as the description proceeds that other frame structures could be provided but that shown and described is excellently suited to the purpose.

A substantially horizontal operator's platform 70 is supported in the base 46 of the frame 45; an operator's seat 71 is supported on chains 72 in the frame upwardly spaced from the platform; and a table 73 is mounted in the frame on legs 74 slightly forwardly and upwardly of the seat.

A pair of upwardly extended support arms 80 provide upper ends and lower ends, the latter being pivotally connected to the top side frame members 60 and 61 by pivot bolts 81 for pivotal movement around a common substantially horizontal axis. An elongated horizontally disposed support bar 82 is rigidly connected to the upper ends of the support arms and has an end extended substantially parallel to said horizontal axis laterally outwardly of the frame 45. A pendent support member 83 is freely pivotally connected to the extended end of the support bar and is downwardly extended for free swinging movement around a substantially horizontal axis defined by the support bar. The pendent member provides a lower end having an eyelet 84 integral therewith.

An hydraulic ram 90 provides a cylinder 91 pivotally connected to the mounting bracket 65 and extended piston rod 92 pivotally connected to a plate 93 secured to the support bar 82 between the support arms 80. Conduits 94 are connected to the ram 90, are extended downwardly over the top bracket 21, and have coupling members 95 at their opposite ends. Coupling members 95 are located adjacent to the coupling members 28 associated with the clamp ram conduit 27 and the coupling members 39 associated with the hydraulic valve conduits 38. Depending on whether the clamp truck 10 is to be used as such or in association with the device of the present invention, the coupling members 39 are connected to the coupling members 28 or to the coupling members 95, respectively.

The ram 90 is provided for moving the support arms 80 between a forwardly inclined load pick-up position, indicated in full lines in Fig. 4, a central upwardly extended load weighing position, shown in dashed lines in Fig. 4, and a rearwardly inclined load release position, also shown in dashed lines in Fig. 4.

Figure 3:
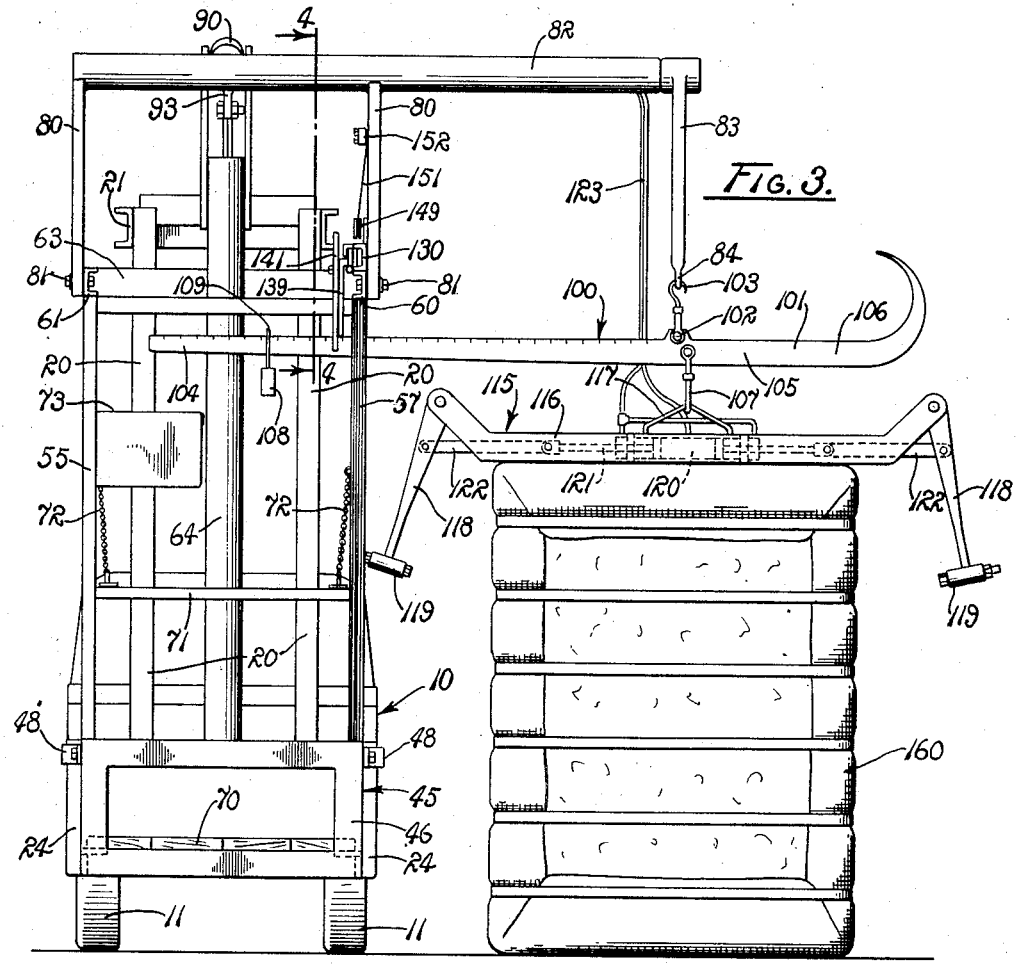
Fig. 3 is a somewhat enlarged front view of the material handling apparatus of the present invention also including a bale of cotton with which the apparatus may be employed.

As best seen in Fig. 3, a beam scales 100 is provided with the present invention and includes an elongated beam 101 having a fulcrum 102 suspended from the pendent member 83 by means of a hook 103 inserted in the eyelet 84. The beam has a calibrated poise supporting end 104 and a load supporting end 105 including an integrally extended, upwardly arcuate counterpoise 106 on opposite sides of the fulcrum. A downwardly dependent hook 107 is connected to the load supporting end of the beam closely adjacent to the fulcrum and is adapted to support a load. A poise or weight 108 is slidably supported on the end 104 of the beam by a hook 109 in any suitable manner.

A load clamp 115 includes an elongated central bar 116 having upwardly angulated ends. A support strap 117 is connected to the central bar, and the hook 107 engages the strap for supporting the clamp on the scales 100. The clamp also provides a pair of clamp arms 118 pivotally connected to the ends of the central bar and including load engaging members 119. Hydraulic rams 120 are mounted on the central bar and include piston rods 121 pivotally connected by means of links 122 to the clamp arms. Conduits 123 are individually connected to the rams and extend rearwardly for connection at their opposite ends to the hydraulic valve 35 on the clamp truck 10.

With particular reference to Figs. 4, 5 and 6, an elongated inwardly facing channel member 130 is secured to the top side member 60 of the frame 45. An erect guide plate 131 is mounted in the channel member, and an elongated rod 132, constituting a track, is secured to the channel member at a lower edge of the guide plate. An angular guide flange 133 is connected to the channel member and has a downwardly overhanging portion positioned in spaced relation to the guide plate and a substantially horizontal portion above the rod.

An elongated slide member 138 is mounted on the rod 132 between the guide plate 131 and the guide flange 133 for slidable longitudinal movement along the rod. A holding plate 139 is rigidly connected in downwardly extended position to the slide member and provides a forward edge having a notch 140 therein. A latch plate 141 having a downwardly extended leg 142 is pivotally connected to the holding plate by means of a pivot bolt 143 and is adapted for movement between a latching position with the leg in bridging relation to the notch, as in Fig. 4, and a position retracted therefrom, as in Fig. 5. A guide bracket 144 is secured to the holding plate in spaced relation thereto for guiding movement of the latch plate. A tension spring 145 interconnects an upper end of the latch plate and the slide member 138 and is adapted to urge the latch plate into latching position.

Pulleys 148 are endwardly extended from the channel member 130 for rotation around horizontal axes transversely of the channel member. Also, pulleys 149 are mounted on the channel member 130 in upwardly disposed positions likewise for rotation around horizontal axes transversely to the channel member. Elongated cables 150 and 151 have ends attached by means of a fastener 152 to the support arm 80 which is adjacent to the channel member 130, are extended around pulleys 148 and 149 as shown in Fig. 4, and have opposite ends secured by means of fasteners 153 to the opposite ends of the slide member 138. The arrangement is such that when the support arm is moved from its forwardly inclined position to its rearwardly inclined position, the slide member moves rearwardly so as to position the holding plate 139 and latch plate 141 on the same side of the pivot axis for the arms 80 as the pendent support member 83, and vice versa.

Operation

The operation of the described embodiment of the present invention is believed to be readily apparent and is briefly summarized at this point. Prior to a discussion of the material handling functions of the present invention, the mounting of the frame 45 on the clamp truck 10 is briefly reviewed. To enable operation of the clamps 24, the conduits 27 are connected to the conduits 38 by their respective couplings 28 and 39. The clamps are opened by proper manipulation of the hand lever 36, and the clamp truck is driven forwardly so that the clamps are spaced outwardly on opposite sides of the base 46 of the frame and with the sockets 25 aligned with the trunnions. The clamps are moved inwardly so that the trunnions are received in the sockets of the clamps. The brackets 48 are then secured to the frame in overlapping relation to the clamps.

It is also to be noted that the thrust bearing frame members 62 are slid rearwardly on opposite outer sides of the guide channels 20 in engagement therewith. The elevator mechanism, not shown, of the clamp truck 10 is then operated to raise the elevator arms 22, and thus the frame 45, into a position such as shown in Fig. 2. The arms 22 are maintained at this elevation during operation of the device of the present invention. The couplings 39 and 28 are then disconnected, and the couplings 39 connected to the couplings 95 for the conduits 94 thereby enabling operation of the ram 90 by the hand lever 36.

Assuming that the device is to be used for weighing bales of cotton, as 160, arranged in rows such as shown in Fig. 1, the clamp truck 10 is driven in a forward path of travel substantially parallel with the row of bales so that the support bar 82 is transverse to the row of bales. It is to be understood that the normal condition of the apparatus prior to actual use thereof preferably is such that the support arms 80 are in a substantially vertical position, the scales 100 are supported in the holding plate 139 with the latch plate 141 in latching position, and the load clamp 115 is in open position. Ordinarily, an operator stands on the platform 70 or sits on the seat 71, and a driver sits on the seat 13 of the clamp truck. It is to be understood, however, that one man could effectively operate the entire apparatus.

The clamp truck 10 is driven forwardly until the front of the frame 45 is adjacent to the rear edge of a bale 160 to be weighed, as seen in Fig. 2. The hydraulic control lever 36 is then operated to pivot the arms 80 forwardly until the pendent support member 83 hangs in approximately the center of the bale to be weighed. In this position the clamp arms 118 are located on opposite sides of the bale, and by operation of lever 37 are brought into engagement with the bale.

Operation of lever 36 lifts the arms 80 to their central upright position thereby also moving the pendent support member 83, the scales 100 and the bale 160 being weighed upwardly and rearwardly. Inasmuch as the bale is now out of contact with its forwardly adjacent bale and the support surface, such as the ground, it may be weighed.

The weight of the bale 160 is first estimated and the poise 108 set in approximate position on the beam 101. The poise supporting end 104 is then pushed forward against the latch plate 141 out of the notch 140 and permitted to swing freely thereof. The poise is then adjusted to an exact position of balance and the observed reading on the scales recorded. The table 73 provides a convenient place for keeping these records.

The beam 101 is then replaced in the notch 140 and the lever 36 operated to move the arms 80 into their rearwardly inclined positions. This lowers the bale 160 back on to the ground at a position longitudinally spaced from its original position but still in alignment with the row. The clamp arms 118 are then disengaged from the bale, and the arms again raised to a substantially vertical position. The truck 10 is then driven forwardly until the front of the frame 45 is adjacent to the rear edge of the next successive bale 160 in the row. This bale and successive bales are then weighed following the same procedure as that described.

The holding plate 139 and latch plate 141, constituting a scale support bracket, prevent the scales from freely swinging about their suspension hook 103 so that the scales are always in a position convenient to the operator. The slide mechanism including member 138, the pulleys 148 and 149 and the cables 150 and 151, enables movement of the bracket with the pendent support member 83 so that the beam 101 and notch 140 are always in substantial alignment with each other and the beam is maintained in substantially constant attitude parallel to the support bar 82. In this regard it is to be recognized that toward the limits of movement of the arms 80, the scale support bracket does lag slightly behind the pendent support member 83, as will be noted in Fig. 4. However, there is substantial alignment between the notch and the beam and this is sufficient to prevent undue twisting of the beam.

The thrust bearing frame member 62 counteracts the weight of the bale 160 being weighed as imposed on the frame and acts to prevent excessive strain on the clamps 24 and base 46 of the frame.

It is to be recognized that the frame 45 need not be attached to a clamp truck 10 or to any other type of vehicle. It is, of course, most effective as a mobile unit but this may be achieved in a variety of ways besides through utilization of a clamp truck, as will be evident.

It is significant that the invention enables the elevation, weighing and the lowering of a bale without the necessity of moving the clamp truck 10 rearwardly. Movement of the bale away from its adjacent bales to enable weighing thereof is accomplished solely by adjustment of the lifting mechanism in marked contrast to the prior art structures. Obviously this results in a saving of time, money and labor and is a far more effective and efficient manner of performing the described tasks than known heretofore.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A material handling apparatus comprising a frame, means supporting the frame for earth traversing movement forwardly and rearwardly along a predetermined line of travel, an upwardly extended arm having an upper end and being pivotally mounted in the frame for movement around an axis transversely of said line of travel between an upwardly inclined position with its upper end forwardly of its pivotal connection to the frame and an opposite upwardly inclined position with its upper end rearwardly of its pivotal connection to the frame, one of said positions being a load pickup position and the other of said positions being a load release position, powered means connected to the arm for moving it between said load pickup and load release positions, a pendent support member, means suspending the support member laterally outwardly of the frame supporting means on the arm for free swinging movement around an axis substantially parallel to the pivotal axis of the arm, and weighing scales having a poise supporting end and a load supporting end borne by the support member intermediate said ends adapted to support a load in laterally spaced relation to the supporting means.

2. A material handling apparatus comprising a frame, a support member, means dependently mounting the support member in the frame for free pivotal movement around a substantially horizontal axis and for movement in an upwardly arcuate path between load pickup and load release positions, powered means connected to the support member mounting means for moving the support member between said positions, an elongated beam scales connected to the support member, load engaging means connected to the scales, a bracket releasably receiving the scales, means mounting the bracket in the frame substantially in alignment with the scales and for movement in a substantially horizontal rectilinear path, and means interconnecting the support member mounting means and the bracket mounting means for moving the bracket in said rectilinear path during movement of the support member between said positions thereby to maintain said substantial alignment of the bracket and the scales.

3. A material handling apparatus comprising a frame; an upwardly extended arm pivotally mounted in the frame for movement around a substantially horizontal axis; powered means mounted on the frame and connected to the arm for moving the arm between oppositely upwardly inclined positions; a pendent support member freely swingably connected to the arm; an elongated scale beam oriented in an erect plane substantially parallel to said horizontal axis having inner and outer ends and pivotally suspended from the support member intermediate said ends; load engaging means on the outer end of the beam; a poise on the inner end of the beam; a beam support bracket substantially aligned with the beam releasably receiving the inner end of the beam; means mounting the bracket in the frame for movement in a substantially horizontal path substantially perpendicular to said horizontal axis; and means interconnecting the bracket mounting means and the arm for moving the bracket with the beam to maintain substantial alignment therebetween.

4. A material handling apparatus comprising a frame; an arm upwardly extended in the frame and pivotally connected thereto for movement around a substantially horizontal pivot axis between oppositely upwardly inclined positions; a pendent support member freely pivotally connected to the arm adapted to remain in a substantially vertical position during movement of the arm; an elongated scale beam lying in a predetermined vertical plane substantially parallel to said pivot axis having a load supporting end, a poise supporting end, and a fulcrum intermediate said ends pivotally connected to the support member; means connected to the load supporting end of the beam for supporting a load to be handled; a poise mounted on the poise supporting end of the beam; a bracket in substantial alignment with the beam releasably receiving said poise supporting end; means mounting the bracket in the frame for horizontal slidable movement in a rectilinear path substantially perpendicular to the pivot axis of the arm; powered means mounted in the frame connected to the arm for moving it between its oppositely inclined positions thereby also moving the beam in an upwardly arcuate path; and means interconnecting the arm and the bracket mounting means for moving the bracket with the beam to maintain substantial alignment therebetween and thereby to maintain the beam in planes substantially parallel to said predetermined plane in all its positions of movement.

5. A material handling apparatus comprising an upright frame mounted for earth traversing movement in a predetermined line of travel; a slide member mounted in the frame for slidable movement along a substantially rectilinear path; a support bracket mounted on the slide member having a notch therein disposed transversely of said rectilinear path; an upwardly extended arm pivotally mounted in the frame for movement around an axis normal to said rectilinear path; a support bar rigidly secured to the arm and transversely extended therefrom laterally of the line of travel of the frame; powered means mounted in the frame connected to the bar for pivoting the arm between a forwardly inclined load pickup position, a rearwardly inclined load release position, and a load weighing position intermediate said pickup and release positions; a scale beam substantially aligned with the notch of the bracket having an end adapted to support a poise and releasably fitted in said notch, and an opposite end adapted to support a load to be weighed; means suspended from the support bar for free swinging movement and connected to the beam intermediate its ends; and means interconnecting the slide member and the arm for moving the slide member incident to movement of the arm to maintain said notch in substantial alignment with the beam.

6. In combination with a powered vehicle movable in a predetermined forward line of travel having spaced upright elevator guide channels providing opposite outer sides, a pair of forwardly located spaced erect clamps mounted for horizontal movement toward and away from each other and for elevational movement in the guide channels; a load handling apparatus comprising an upright frame having a base portion releasably supported between the clamps, and a top portion including a rearwardly extended thrust bearing member in engagement with a guide channel on an outer side thereof; an upwardly extended arm pivotally mounted in the top portion of the frame for movement around an axis transverse to said line of travel; a substantially horizontal support bar secured to the arm and extended laterally outwardly of the frame on the opposite side of said guide channel from the thrust bearing member transversely of said line of travel; a pendent support member freely pivoted to the bar; means for engaging a load connected to the pendent support member; and powered means mounted in the frame connected to the bar for pivotally swinging the arm.

7. In combination with a powered vehicle movable in a predetermined forward line of travel having spaced upright elevator guide channels providing opposite outer sides, a pair of forwardly located spaced erect clamps mounted for horizontal movement toward and away from each other and for elevational movement in the guide channels; a load weighing and positioning apparatus comprising an upright frame having a base portion releasably supported between the clamps, and a top portion including a rearwardly extended thrust bearing member in engagement with a guide channel on an outer side thereof; an upwardly extended arm pivotally mounted in the top portion of the frame for movement around an axis transverse to said line of travel; a substantially horizontal support bar secured to the arm and extended laterally outwardly of the frame on the opposite side of said guide channel from the thrust bearing member transversely of said line of travel; a pendent support member freely pivoted to the bar; an elongated beam scales pivotally suspended from the pendent arm adapted to lie in a substantially vertical plane normal to said line of travel having an end inwardly extended toward the frame and an opposite outwardly extended end; load engaging means borne by the outwardly extended end of the scales; a slide mounted in the frame for longitudinal slidable movement along a path substantially aligned with the path of travel of the vehicle; a bracket downwardly extended from the slide in substantial alignment with the scales releasably receiving the inwardly extended end thereof; powered means mounted in the frame connected to the bar for moving the arm between longitudinally spaced load pickup and load release positions and a load weighing position intermediate the pickup and release positions; and flexible means interconnecting the arm and the slide for moving the slide incident to arm movement to maintain the bracket in substantial alignment with the scales.

8. In combination with a powered vehicle movable in a predetermined forward line of travel having spaced upright elevator guide channels providing opposite outer sides, a pair of forwardly located spaced erect clamps mounted for horizontal movement toward and away from each other and for elevational movement in the guide channels; an apparatus for lifting successive bales of material previously arranged in a row in substantially parallel adjacent relation to said line of travel, weighing each bale while lifted, and lowering the weighed bales in a row in positions rearwardly spaced from their positions prior to being lifted comprising an upright frame having a base portion releasably supported between the clamps, and a top portion including a rearwardly extended thrust bearing member in engagement with a guide channel on an outer side thereof; an operator's platform mounted in the base portion; an upwardly extended arm pivotally mounted in the top portion of the frame for movement around an axis transverse to said line of travel; a substantially horizontal support bar secured to the arm and extended laterally outwardly of the frame on the opposite side of said guide channel from the thrust bearing member transversely of said line of travel; a pendent support member freely pivoted to the bar; a weighing scales carried by the pendent arm; means for engaging a load connected to the scales; and powered means mounted in the frame connected to the bar for pivotally swinging the arm.

9. A material handling apparatus comprising an upright frame; an elongated horizontal guide track mounted in the frame; a slide member mounted in the track for longitudinal slidable movement therein; a holding plate downwardly extended from the slide member having a notch therein; a latch plate pivotally connected to the holding plate for movement between a position bridging the notch and a position retracted therefrom; a tension spring interconnecting the latch plate and the slide member yieldably urging the latch plate into said bridging position; an upwardly extended arm pivotally mounted in the frame for movement around a substantially horizontal axis normal to the track between opposite upwardly inclined positions; a horizontal support bar rigidly mounted on the arm substantially parallel to said axis; powered means mounted in the frame connected to the support bar for moving the arm between said oppositely inclined positions; a pendent support link freely pivotally connected to the bar thereby to remain in substantially vertical position during movement of the arm; an elongated scale beam substantially aligned with the notch in the holding plate having a fulcrum pivotally supported on the support member, a load supporting end and a balancing end releasably receivable in said notch; a poise supported on the balancing end of the beam; load engaging means suspended from the load supporting end of the beam; and means interconnecting the slide member and the arm for moving the slide member in response to movement of the arm to maintain the beam and said notch substantially aligned with each other.

10. A material handling apparatus comprising a frame; an elongated beam scales having opposite end portions; means connected to the scales intermediate said end portions supporting the scales in the frame for movement in a path transversely of the scales between horizontally spaced positions; a scales guiding bracket releasably receiving an end portion of the scales; means mounting the bracket in the frame in substantial alignment with the scales for movement in a substantially rectilinear horizontal path substantially parallel to the path of movement of the scales; and means interconnecting the scales supporting means and the bracket for moving the bracket incident to movement of the scales supporting means and restraining the bracket and the scales to substantial alignment.

11. A material handling apparatus comprising a frame; a support member; means dependently mounting the support member in the frame for free pivotal movement around a substantially horizontal axis and for movement in an upwardly arcuate path between load pickup and load release positions; an elongated beam scales having a load supporting end portion, an intermediate fulcrum connected to the support member, and an opposite poise supporting end portion; a bracket releasably receiving the poise supporting end of the scales; means mounting the bracket in the frame substantially in alignment with the scales and for movement in a substantially horizontal rectilinear path; and means interconnecting the support member mounting means and the bracket mounting means for moving the bracket in said rectilinear path during movement of the support member between said positions thereby to maintain said substantial alignment of the bracket and the scales.

12. A material handling apparatus comprising a frame mounted for movement in a predetermined line of travel; a slide member mounted in the frame for slidable movement along a predetermined path; a releasable beam support bracket mounted on the slide member; an upwardly extended arm pivotally mounted in the frame for movement around an axis normal to said rectilinear path between a forwardly inclined load pickup position, a rearwardly inclined load release position, and a load weighing position intermediate said pickup and release positions; a support bar secured to the arm and transversely extended therefrom laterally of the line of travel of the frame; a scale beam substantially parallel to the bar having an end adapted to support a poise and releasably supported in the bracket, and an opposite end adapted to support a load to be weighed; means suspended from the support bar for free swinging movement and connected to the beam intermediate its ends; and means interconnecting the slide member and the arm for moving the slide member incident to movement of the arm to maintain the beam and bar in substantial parallelism.

References Cited in the file of this patent

UNITED STATES PATENTS

| | | |
|---|---|---|
| 502,810 | Coupland et al. | Aug. 8, 1893 |
| 760,158 | Schneider | May 17, 1904 |
| 2,587,769 | Rowe | Mar. 4, 1952 |
| 2,737,381 | Attaway | Mar. 6, 1956 |

FOREIGN PATENTS

| | | |
|---|---|---|
| 479,501 | France | Jan. 11, 1916 |